United States Patent [19]
Pavlath

[11] Patent Number: 5,970,197
[45] Date of Patent: Oct. 19, 1999

[54] OPTICAL FIBER FOR REDUCING OPTICAL SIGNAL REFLECTIONS

[75] Inventor: George A. Pavlath, Thousand Oaks, Calif.

[73] Assignee: Litton Systems, Inc., Woodland Hills, Calif.

[21] Appl. No.: 09/227,871

[22] Filed: Jan. 8, 1999

Related U.S. Application Data

[62] Division of application No. 08/861,679, May 22, 1997, Pat. No. 5,926,600.

[51] Int. Cl.$^6$ .................................................. G02B 6/10
[52] U.S. Cl. ............................ 385/123; 385/144; 385/43; 385/126
[58] Field of Search ................................. 385/123, 126, 385/127, 128, 43, 141, 144

[56] References Cited

U.S. PATENT DOCUMENTS

| | | | |
|---|---|---|---|
| 3,646,473 | 2/1972 | Young | 350/96.3 |
| 3,774,173 | 11/1973 | Love et al. | 350/96.27 |
| 4,533,210 | 8/1985 | Jeskey | 350/96.3 |
| 5,594,828 | 1/1997 | Nielsen et al. | 385/121 |

*Primary Examiner*—Hung N. Ngo
*Attorney, Agent, or Firm*—Price, Gess & Ubell

[57] ABSTRACT

Attenuation of an optical signal at the end of an optical fiber is achieved by positioning a high absorption region at the end of the fiber. A first embodiment teaches highly doped wedges within a tapered end of the fiber. The highly doped wedges adjacent the light transmitting core serve to absorb light at the end of the fiber. The light transmitting core of the fiber is reduced in diameter due to the tapering, causing the field of light to expand beyond the core. The highly doped wedges are in proximity to the core due to the tapering. The wedges, which are preferably heavily doped with a rare earth such as erbium, absorbs the escaping light in sufficient quantities, both in the initial pass through the tapered region and again upon reflection of the light at the end of the tapered region, such that the attenuation of the reflected light is within acceptable limits without regard to the condition of the fiber's end surface.

20 Claims, 1 Drawing Sheet

OPTICAL FIBER FOR REDUCING OPTICAL SIGNAL REFLECTIONS

This is a division of pending U.S. application, Ser. No. 08/861,679, filed May 22, 1997, now U.S. Pat. No. 5,926,600.

BACKGROUND OF THE INVENTION

1. Field of the Invention

The present invention relates generally to optical fibers, and specifically to an optical fiber that can be terminated with de minimizes reflection.

2. Description of Related Art

Optical fibers are widely used for transmitting optical signals because a near loss-less transmission can be achieved under ideal circumstances. One such fiber is a fused silica ($SiO_2$) fiber having a core region doped with an element chosen to alter the fiber's index of refraction in that region, germanium being especially well suited for this function. The index of refraction of the pure fiber is typically 1.45, whereas the core region doped with, for example, 1 percent germanium is 1.456. As a consequence, light traveling down the core region will reflect at the boundary between the doped core and the pure silica rather than being transmitted through the boundary, which leads to a communication of essentially the entire signal from one end of the fiber to the other.

The fiber's core diameter is optimally related to the designated light wavelength to be transmitted, where a 4 micron diameter equates roughly to an 800 nanometer wavelength of light and a 10 micron diameter corresponds to a 1550 nanometer wavelength of light. Depending upon the amount of germanium, the loss in a 1550 nanometer signal can range from 0.2 to 2 decibels per kilometer of fiber.

The fiber just described is a passive fiber in that it merely communicates an input signal from one end to the other. In addition to communicating optical signals, special fibers can also generate a light source by introducing an excitation signal into a specially doped fiber which in turn causes the fiber to emit a light characteristic of the dopant. These "active" fibers can be doped with one or more of the rare earth family of elements such as erbium or neodynium. For discussion purposes we will describe a fiber doped with erbium, although it is to be understood that the invention covers a fiber doped with any of the elements which have similar characteristics to those described herein. When erbium is pumped with a laser at the appropriate wavelengths, it emits a light in the 1530 to 1560 nanometer (nm) wavelength. Other dopants include neodymium which emits at 1.06 micron and praseodymium which emits in the 1.3 micron region. An erbium doped fiber will comprise approximately 50 to 500 parts per million (ppm), which is between 0.05% and 5% of the concentration of germanium in the passive fibers.

When an erbium doped fiber is supplied with a source of energy being pumped into the fiber, such as for example a 1480 nanometer (nm) laser diode, the electrons in the erbium absorb the energy and jump to a higher energy state. The stored energy is eventually released leading to a growing cascade of 1550 nm light traveling down the fiber. This light can be used to power an optical component such as a fiber gyro. The fiber gyro typically includes a detector to measure the electrical voltage generated by the incoming light. The electrical voltage is demodulated and the light output is measured, and the system is then adjusted based on the measurements. A product of the operation of the fiber gyro is that some of the 1550 nm incoming light is reflected from the fiber gyro back down the erbium fiber. It is estimated that approximately between 0.1% and 4% of the original light is reflected back into the erbium fiber under normal conditions.

This reflected light enters the erbium doped region, which acts as a high gain device. Light which enters the fiber travels through it until it reaches the far end of the fiber, where the light is partially transmitted and partially reflected back down the fiber into the erbium doped region. The feedback from both the fiber gyro and the reflection at the fiber can create an unstable condition for the high gain EDF. If the end of the fiber provides a low reflectance of the incident light such as less than $10^{-6}$, then the system will generally be stable and performance will not degrade. However, if the reflectance of the incident light is greater than $10^{-4}$, oscillations will occur which will degrade the output to the point where the system becomes unproductive. The problem, then, is to attenuate the amount of reflected light to at least less than $10^{-5}$ and preferably to less than $10^{-6}$.

The index of refraction is approximately 1.45 for the fiber and 1.0 for air. A typical internal reflection for a fiber end cut perpendicular to its axis would yield a 4% reflection or $4\times10^{-2}$. This reflectance is well outside normal operating parameters for fiber systems and quickly results in detrimental oscillations in the system.

To decrease the reflectance at the end of a fiber, the fiber 10 may be cleaved at the end 12 at approximately 15 to 20 degrees, as shown in FIG. 1, which can decrease the reflectance to appropriate limits under ideal conditions. Light (indicated by arrow 14) traveling in the core 20 reaches end 12, and some light 16 is transmitted through the fiber while other light 18 is reflected back into the fiber. However, the light 18 reflected back into the fiber is deflected to a steeper angle due to the inclination of the end 12. This causes the light to exit the core 20 because the light 18 can no longer reflect down the core 20. This occurs because propagation of the reflected light does not occur if the light incident on the core interface is greater than approximately 4 to 5 degrees. Reflectance on the order of $10^{-6}$ can be achieved by this method only under ideal conditions.

The problem with this solution is that it is difficult to achieve a smooth cut in a fiber that is only 80 microns to 125 microns in diameter. Aberrations in the cleaved surface can result in excessive light being reflected back down the fiber, which leads to feedback. Moreover, even if a smooth surface is created initially, installation of the fiber often leads to damage at the surface where hackles or chips can develop and accumulate. Furthermore, it is impossible to verify the integrity of the surface of the fiber's end until the fiber is installed in a system and the electrical output from the fiber gyro is demodulated. If the fiber turns out to be unsatisfactory, the entire system must be disassembled and the fiber refinished or replaced, at considerable expense to the user. The inability to verify the condition of the fiber's end until the system is assembled and operating is a major drawback of the prior art.

To protect the cleaved fibers, it is known to insert the end into a precision capillary glass tube having an inner diameter just slightly larger than the outer diameter of the fiber, which serves to protect the end of the fiber. Epoxy is added to fill the gap so that the fiber end is less susceptible to jarring or damage. This process is expensive, and fibers are frequently damaged in the process of insertion into the glass tubes. Once inserted into the glass tube, there is still no assurance that the fiber will perform properly until the system is assembled and the output is checked. Reassembling and disassembling the system also leads to damaged fibers, and the use and testing of the fibers becomes a prominent cost of the system.

What is needed in the art is an optical fiber which is not dependent upon the condition of the end surface or the quality of the cleave in order to achieve the desired reflectance conditions.

SUMMARY OF THE INVENTION

The object and general purpose of the present invention is accomplished by a fiber having a light transmitting core in proximity with regions of high absorption of light at the terminating end, preferably coupled with an increase in the amount of light escaping through the core regions. The high absorption regions attenuate a high percentage of the light traveling in the core prior to the interaction with the end of the fiber. Of the small amount of light which escapes these high absorption regions, only approximately 4% of the light will reflect at the boundary back into the fiber. This reflected light is again subject to the same high absorption regions upon its reflection. Absorption can be achieved by doping regions adjacent the core with a substance which will absorb the wavelength of the light being emitted by the core region. For example, a pair of wedges heavily doped with erbium and adjacent the erbium doped core will cause all light incident on the wedges to be absorbed and converted to heat. By varying the concentration of the dopant, the length of the absorption region, and the geometry of the fiber in the absorption region, the light which survives both encounters with the absorption regions (initially and upon reflection) can be controlled to fall within a desired reflectance limit.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like components throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art since the general principles of the present invention have been defined herein specifically to provide an optical fiber for reducing reflected light to within predetermined limits at predetermined locations along the fiber or at an end of the fiber.

Figure 1:
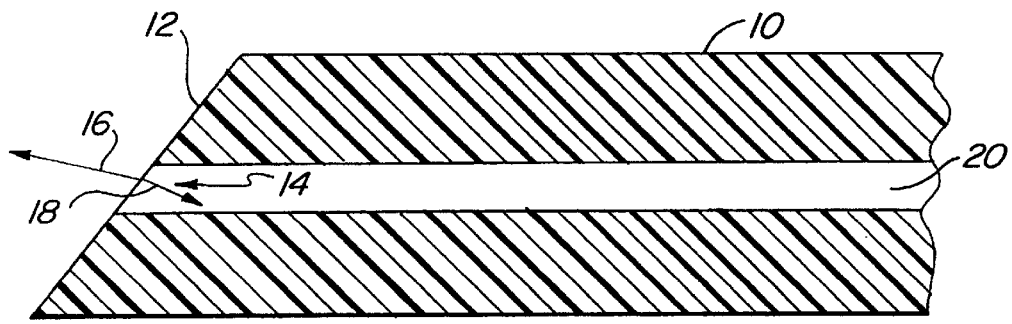
FIG. 1 is a cross sectional axial view of a prior art optical fiber with a cleaved end.
Figure 2:
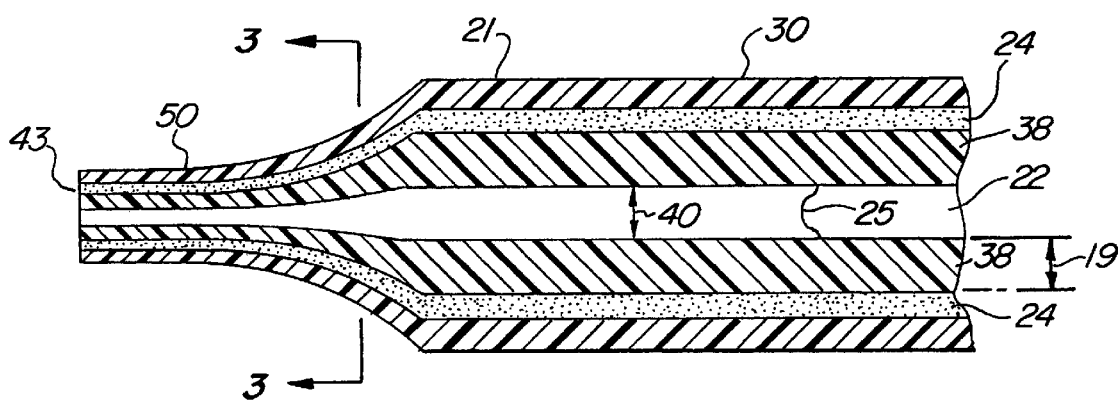
FIG. 2 is a cross sectional axial view of an optical fiber of the present invention in a first preferred embodiment.
Figure 3:
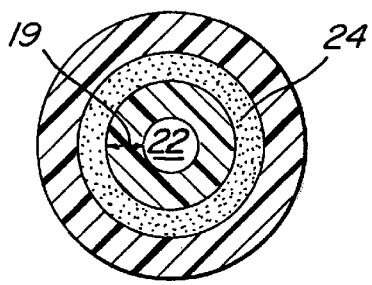
FIG. 3 is a cross sectional radial view of an optical fiber of the present invention in the first preferred embodiment.

A first preferred embodiment of file present invention is illustrated generally in FIGS. 2 and 3, which show an axial cross section and a radial cross section of a fiber 21 having both a core 22 and a secondary region 24. The fiber 21 can also be divided into a signal transmitting portion 30 and a signal attenuating portion 50. The core 22, like in the prior art fiber, causes light to be transmitted down the fiber, with a small percentage of the light traveling through the core escaping out of the perimeter of the core. The core 22 will typically contain at least 1% germanium and will also be doped with a rare earth dopant, such as erbium for example, in the "active" region of the fiber (not shown). The erbium concentration can be anywhere from between 50 to 500 ppm or more to obtain a desired strength of the generated optical signal.

The fiber 21 is tapered at the signal attenuating portion 50, which causes the core to narrow and also causes the secondary region 24 to encroach on the core 22. As shown in FIG. 3, the core 22 and the secondary region 24 remain essentially concentric throughout the tapered region 50. In the signal transmitting portion 30 of the fiber 21, a signal 25 traveling towards the end 43 of the fiber is essentially contained within the core 22, although a small amount of light is transmitted into the intermediate region 38 between the core and the secondary region. This light, referred to as the evanescent tail, does not result in an appreciable energy transfer into the intermediate region 38 along the length of fiber prior to the tapered region, and hence there is no significant attenuation in the signal transmitting region 30.

The secondary region 34 contains a heavily doped composition of erbium or other element which creates a light absorbing medium for the wavelength of light signal in the core. The family of rare earth elements have been shown to be especially suited for this purpose. Quenching is understood to be the total absorption of incident light and occurs at high concentration levels of the dopant. For erbium, quenching in the secondary region 24 requires a concentration of erbium of at least between 0.1% to 1%, causing any light escaping through the core to be absorbed. Since only attenuation is desired at the end of the fiber, in the region 30 the spacing 19 between the core 22 and the secondary region 24 is sufficiently large such that the secondary region 24 has no effect on the signal traveling in the core. For example, if the evanescent tail extends 1 to 2 microns into the intermediate region 38 then the gap 19 between the core 22 and the secondary region 24 is preferably 8 to 10 microns and the secondary region 24 is completely isolated from any light escaping from the core 22.

At the tapered end 50 of the fiber 21, the secondary region 24 is brought closer to the core as the gap 19 is reduced. The reduction in the diameter of the core in this region causes more light to escape the core into the intermediate region 38 as the evanescent tail expands. The result of the narrowing core and the proximity of the secondary region is the secondary region intersecting the periphery of the evanescent tail in the attenuating portion 50 of the fiber. Due to the quenchin effect of the doped secondary region 24, the light emanating from the core is absorbed by the secondary region, which attenuates the optical signal in the core. The more light escaping from the core, the more attenuation of the optical signal occurring in the secondary region.

As the core 22 narrows further, almost all of the light will escape out of the core 22 as the core's diameter 40, which has been reduced from a maximum of 10 microns at the beginning of the tapering to a minimum of 2 to 3 microns at the end of the taper for example, can no longer accommodate the 1550 run wavelength light traveling through it. The reduction in the fiber's diameter 40 through the tapered region 50 is approximately 4:1 for example, so that a 10 micron core diameter will be reduced to a 2.5 micron core diameter and the 10 micron gap 19 initially between the core 22 and the secondary region 24 is reduced to 2.5 microns. The initial penetration of the evanescent tail of 1 to 2 microns will expand to 5 to 10 microns in the narrowest section of the taper, and the absorption rate along the narrowest part of the tapered region 50 can be on the order of tens of percent per centimeter of fiber length.

Any light which is not absorbed reaches the end 43 of the fiber 21, where it will be either transmitted out of the fiber or reflected back along the core 22 through the tapered region 50. If each pass in the high absorption region results in losses translating to a $10^{-3}$ transmission, even a 100% reflection at the end 43 of the fiber 21 will still be within the acceptable limits of $10^{-6}$. As a consequence, the prior art importance of the angle and finish at the end of the fiber is now eliminated. When the tapering operation is complete, there is no other inspection that needs be performed. If desired, the tapered fiber can be mechanically reinforced using traditional reinforcement procedures. One such procedure is to secure the fiber's end to a slide with epoxy and placing a tube over the slide to protect the fiber. There is no longer a need to fit the fiber into a capillary tube where splintering can occur. Moreover, the ability to use a plain slide as a support is a vast improvement over the prior art. The protective tube is easy to handle and less likely to be damaged than a capillary tube. Alternatively, a tube may be placed over the untapered fiber end and the combination stretched simultaneously to yield a finished, mechanically protected fiber termination which is both durable and reliable.

The present invention solves another problem associated with the transmittal of light along a optical fiber. Cladding modes refer to the propagation of light in the intermediate region, or "cladding," 38 of the fiber, which occurs as light 20 escapes from the core 22 and reflects between the outer boundary of the fiber. The phenomenon results in detrimental interference and distortion of the signal in the core. Cladding modes are diminished in the optical fiber of the present invention by the absorption of the stray light in the intermediate region by the doped secondary region. As the propagating light encounters the quenching region, the light becomes absorbed 25 by the doped material and the propagation of the undesirable light is significantly reduced or eliminated.

Tapering of the fiber preferably occurs in the glass softening temperature range. Methods currently in use for fused biconical tapered couples may be used to effect the taper. The plastic range allows the stretching or tapering to occur while the cross section of the fiber remains proportional. It is also conceivable that the secondary region occurs only in the absorption region since it has no effect on the operation of the fiber outside of this region, although for practical purposes the entire length of the fiber is manufactured with the secondary region.

Although erbium has been used as an example of a suitable dopant, it is to be understood that any material which satisfies the principles described above can be used. Each of the rare earths are believed to work as dopants to varying degrees depending on the desired wavelength of output power. Other dopants include neodymium, yttrium, and praseodymiuma although this list is not exclusive. The dopant in the secondary region is chosen to absorb the wavelength propagating in the core region.

Figure 4:
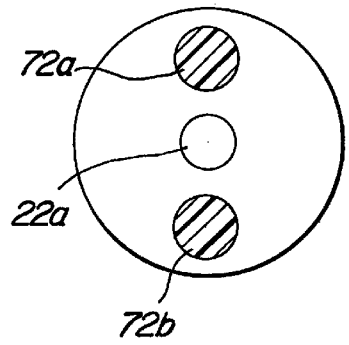
FIG. 4 is a cross sectional axial view of an optical fiber of the present invention in a first alternate embodiment.
Figure 5:
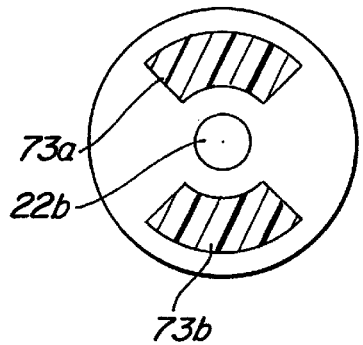
FIG. 5 is a cross sectional radial view of an optical fiber of the present invention in a second alternate embodiment.

Furthermore, although an annulus is depicted as the shape of the secondary region in FIGS. 2 and 3, it is to be understood that many geometries are possible which, when brought in proximity to the core region, will provide the absorption necessary to achieve the objectives of the present invention For example, FIGS. 4 and 5 illustrate alternate embodiments depicting cross sections having two cylindrical regions 72*a, b* and two wedge-shaped regions 73*a, b*, respectively, disposed adjacent the core 22*a, b* which would produce the same effect when brought in proximity with the core as the previously discussed annulus. The surrounding of the core need not be "total" but only "partial" to effect the present invention as long as the secondary regions 75 are sufficiently large with respect to the core regions 76 to effect the desired quenching. One skilled in the art could envision many other suitable geometries which would effect the present invention other than those explicitly discussed herein, and the present invention is intended to include all such geometries. For example, other possibilities included concentric annular rings and multiple cylinders or wedges, and the invention is not limited to particular set of geometries.

It is also to be understood that the present invention can be used to reduce or attenuate an optical signal at any desired location along the fiber and is not limited to the end of the fiber. A tapered or necked region can be implemented at any desired position and the fibers can easily be manufactured to include the highly doped secondary region throughout the fiber. Hence, should an attenuation of the optical signal be required at some location other than the end of the fiber, the fiber can be tapered using the above described methods at the desired point of the fiber, and the present invention will be effected at that point as the secondary region is brought in proximity with the core region as the core region is reduced.

It will be understood that the embodiment described herein are merely exemplary and that a person skeled in the art may make many variations and modifications without departing from the spirit and scope of the invention. All such variations and modifications are intended to be included within the scope of the invention as defined in the appended claims.

What is claimed is:

1. An optical fiber with an improved signal attenuation section, said signal attenuation section comprising:
    a doped core;
    first and second doped wedges aligned parallel to and adjacent said doped core; and
    a taper of said optical fiber such that said taper locates said first and second doped wedges closer to said doped core to absorb signal emanating from said doped core.

2. The optical fiber of claim 1 wherein said doped core includes erbium.

3. The optical fiber of claim 2 wherein said doped core includes a concentration of erbium between 50 and 500 parts per million.

4. The optical fiber of claim 1 wherein said doped core includes germanium.

5. The optical fiber of claim 4 wherein said doped core includes a concentration of germanium of approximately one percent.

6. The optical fiber of claim 1 wherein said doped core includes yttrium.

7. The optical fiber of claim 1 wherein said doped core includes praseodymium.

8. The optical fiber of claim 1 wherein said doped core includes neodymium.

9. The optical fiber of claim 1 wherein said first and second doped wedges include erbium.

10. The optical fiber of claim 1 wherein said first and second doped wedges include a concentration of erbium of at least 1000 parts per million.

11. The optical fiber of claim 1 wherein said first and second doped wedges include germanium.

12. The optical fiber of claim 1 wherein said first and second doped wedges include neodymium.

13. The optical fiber of claim 1 wherein said first and second doped wedges include yttrium.

14. The optical fiber of claim 1 wherein said first and second doped wedges include praseodymium.

15. An improved optical fiber having a doped signal transmitting core, said improvement directed to a signal attenuating portion comprising:

a tapering of said optical fiber; and at least first and second wedge-shaped signal absorbing regions spaced from said signal transmitting core, said first and second wedge-shaped signal absorbing regions residing within an optical field emanating from said signal transmitting core as a result of said tapering of said optical fiber.

16. The improved optical fiber of claim 15 wherein said first and second wedge-shaped signal absorbing regions comprise a concentration of a rare earth metal sufficient to quench the signal emanating from said signal transmitting core.

17. An optical fiber comprising:

an optical signal transmitting core centrally located within said optical fiber;

a glass medium housing said centrally located optical signal transmitting core; and an optical signal attenuating region, said optical signal attenuating region comprising a tapering of said optical signal transmitting core to increase a quantity of signal escaping said optical signal transmitting core, and a pair of wedge-shaped optical signal absorbing regions located adjacent said tapering of said optical signal transmitting core.

18. An optical fiber comprising:

means for transmitting an optical signal through a glass medium;

means for increasing a quantity of optical signal escaping from the means for transmitting an optical signal; and first and second wedge-shaped means within said glass medium and spaced from said means for transmitting an optical signal for selectively absorbing optical signal escaping from said means for transmitting an optical signal.

19. The optical fiber of claim 18 wherein said means for transmitting an optical signal through a glass medium includes a rare earth doped medium, and said first and second wedge-shaped means include a rare earth doped region.

20. The optical fiber of claim 19 wherein said means for increasing a quantity of optical signal escaping from the means for transmitting an optical signal comprises an alteration of a shape of said means for transmitting an optical signal thereby reducing the capacity of said means for transmitting an optical signal.

* * * * *